United States Patent Office 3,085,444
Patented Apr. 16, 1963

3,085,444
GYRO APPARATUS
Lawrence B. Lynn, Wilkinsburg, Pa., assignor to Westinghouse Electric Corporation, East Pittsburgh, Pa., a corporation of Pennsylvania
Original application June 19, 1957, Ser. No. 666,697, now Patent No. 2,953,149, dated Sept. 20, 1960. Divided and this application Dec. 7, 1959, Ser. No. 857,740
5 Claims. (Cl. 74—5.4)

The present application is a division of my copending patent application, Serial No. 666,697, entitled "Dynamic Response Valve," filed June 19, 1957, now Patent No. 2,953,149.

This invention relates to a gyro apparatus and more particularly to a gyro capable of varying sensitivity in direct ratio to an input control pressure.

An object of the invention relates to provision of such a gyro apparatus in which the input control pressure is established by the velocity of an aircraft employing same.

Other objects, purposes and characteristic features will become clear as the specification progresses.

Figure 1:
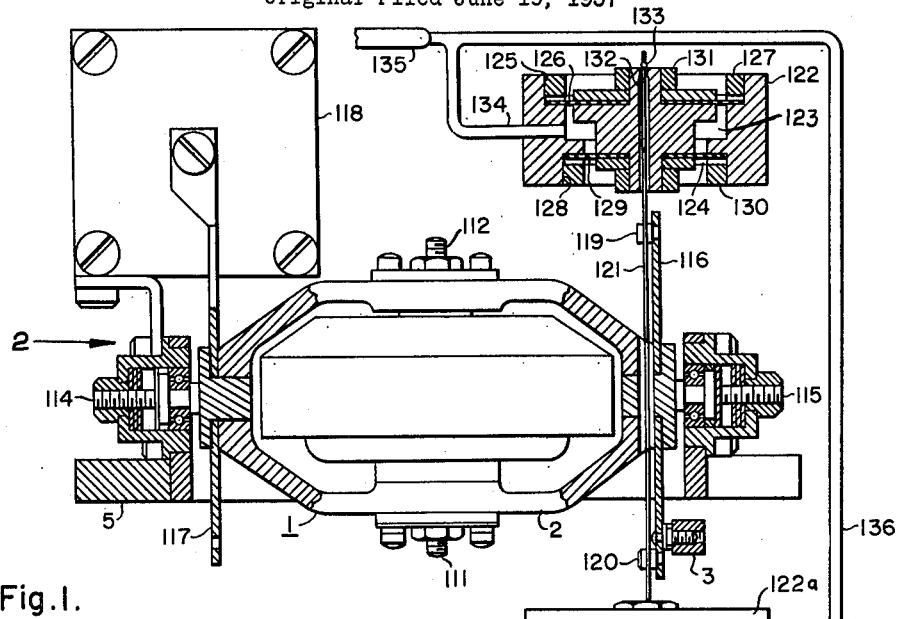
Figure 2:
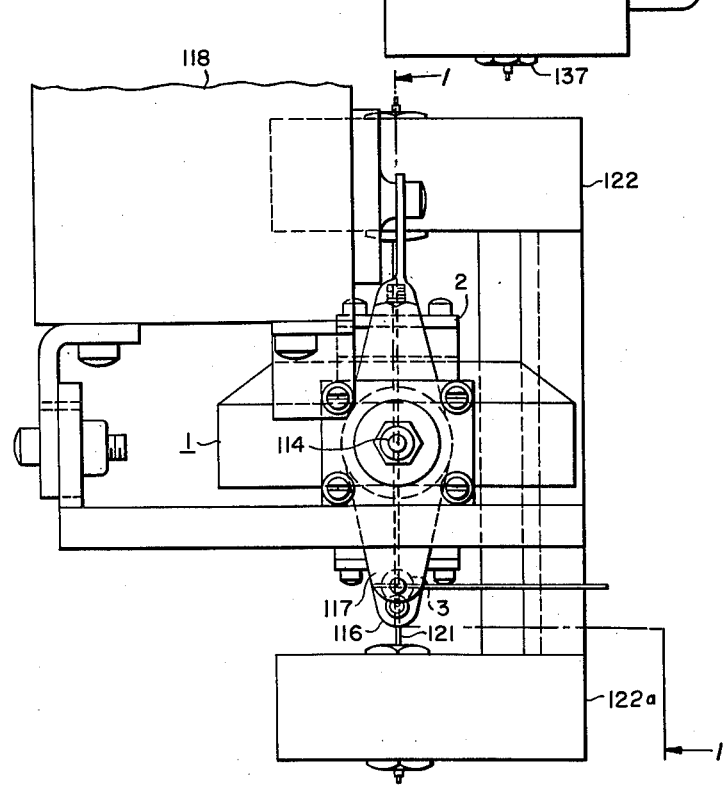

FIGURE 1 is a sectional view showing the details of the gyro embodying the invention; and FIG. 2 is an elevational view showing the details of the relationship between the control gyro and its sensitivity and damping control members.

In each of the several views, similar parts bear like reference characters.

Description

The gyro 1 when used on a vehicle such as an aircraft capable of operation through a great range of speeds, such for example involving range of speeds Mach 0.1 to more than Mach 1.0 will be called upon to provide adequate stabilization augmentation over the entire range without over or under-control. For this reason, a pressure sensitive gain device is provided for varying the actual movement of the gyro on its pivots. This structure is shown in FIGS. 1 and 2 and is set forth as follows. The gyro 1 is provided with pivots at points 111 and 112, not shown in detail in these views, for supporting the gyro on a gimbal 2 which is capable of moving about pivots 114 and 115. The pivots 114 and 115 are rigidly mounted on the body 5 in any suitable manner. The gimbal 2 is provided with a pair of control arms 116 and 117 located adjacent the ends of the gimbal supported by the pivots 115 and 114, respectively. The arm 117 is connected to a damping device 118, the structure of which is not shown since it forms no part of this invention, but may be of any well-known type, such as a magnetic type of damping. The arm 116 is provided with a pair of securing pins 119 and 120 capable of receiving a centering spring or bias in the form of a flexible member 121 usually of steel wire construction. The flexible member 121 is secured to the pins 119 and 120 in any suitable manner, such as passing through openings or grooves therein. The flexible member then extends outwardly beyond the ends of the arm 116 to be secured within the pressure responsive members 122 and 122a. Since the members 122 and 122a are identical in structure, the structure of the member 122 only will be described in detail.

The member 122 is provided with a central opening 123 passing therethrough. The opening 123 is provided with a reduced diameter portion 124 adjacent one end of the pressure device 122. Positioned within a step 125 of the opening 123 is a diaphragm 126 secured in position on the step 125 by a securing ring 127. Secured within a step 128 in the reduced diameter portion 124 of the opening 123 is a diaphragm 129 of smaller diameter than the diaphragm 126. The diaphragm 129 is secured in place on the step 128 by a securing ring 130. Supported centrally of the diaphragms 126 and 129 is a piston 131 provided with a central opening 132 for receiving the flexible member 121 for securing purposes as by a securing bead 133. The cylinder 123 and reduced portion 124, located between the diaphragms 126 and 129, is provided with an inlet pipe 134 connected to a Pitot tube or other similar device 135 subjected to ram air pressures in response to vehicle movement through the atmosphere. Likewise, the pressure responsive member 122a is also connected to the Pitot tube 135 by the pipe 136 in order to respond to ram air pressures proportional to the vehicle speed.

It can be seen that as the pressure increases into the head of the Pitot tube 135 and thus in the areas between the diaphragms of the pressure responsive devices 122 and 122a, the area differential of these diaphragms causes the piston 131 of the pressure responsive device 122 and the piston 137 of the pressure responsive device 122a to develop increased tension in the flexible member 121. For the small precessional angles through which the gyro moves, the stiffness restraint introduced by the tension element 121 acting on radial levers 116 is essentially proportional to the applied control pressure established by the Pitot tube. Design parameters may be chosen to produce the required velocity sensitivity calibration pattern.

In order to prevent over control of a vehicle moving through space at high speeds or under control of the vehicle moving through space at low speeds, the pressure biasing device is necessary. Without the pressure biasing device, stability augmentation could only be established at some desired average speed thus resulting in over control at higher speeds and under control at lower speeds.

Since numerous changes may be made in the above-described construction and different embodiments of the invention may be made without departing from the spirit and scope thereof, it is intended that all the matter contained in the foregoing description or shown in the accompanying drawing shall be interpreted as illustrative and not in a limiting sense.

What is claimed is:

1. A rate of change responsive device comprising a gyro gimbal having a pivot support affording rotary precessional movement about the support axis, a flexible elongated tension member extending transversely of said support axis for applying a restraint force to oppose the precessional movement of said gyro gimbal, adjustable means for varying the tension of said tension member, and lever means secured to said gimbal for rotary precessional movement therewith and connected to said tension member intermediate its ends for bending engagement therewith.

2. A rate of change responsive device comprising a pivotally supported gyro, an elongated flexural bias means for applying a restraint force to oppose precessional movement of said gyro, and adjustable pressure means for varying the spring-constant characteristic of said bias means, said adjustable pressure means comprising a pair of diaphragm members positioned in opposing relationship operatively connected to opposite ends of said bias means to control the tension thereof, and link means connecting said bias means to said gyro.

3. A rate of change responsive device comprising a pivotally supported gyro, a centering bias means for applying a restraint force to oppose precessional movement of said gyro, and adjustable pressure means for varying said restraint force per unit of such movement, said adjustable pressure means comprising a pair of diaphragm members positioned in opposing relationship, and said bias means including a flexible elongated tension member secured at its ends to said diaphragms and intermediate its ends to said gyro through radial levers about the precession axis of said gyro.

4. A rate of change responsive device comprising a pivotally supported gyro, a bias means for applying a stiffness restraint force to oppose precessional movement of said gyro, and adjustable pressure means for varying the restraint gradient of said bias means, said adjustable pressure means comprising a pair of diaphragm members positioned in opposing relationship, and said bias means including a tensioned flexible spring member secured at its ends to said diaphragms and to said gyro at radial levers about the gyro precession axis, said levers and tensioned flexible spring member producing a restoring torque upon a displacement of said gyro.

5. A rate of change responsive device comprising a pivotally supported gyro, a control member operably connected to said gyro, a bias means for applying a restraint force to oppose movement of said gyro, and adjustable pressure means for varying the restraint gradient of said bias means, said adjustable pressure means comprising a pair of diaphragm members positioned in opposing relationship, and said bias means including link means connecting said diaphragm members to said gyro, each of said pair of diaphragm members comprising two diaphragm elements of unequal area capable of producing opposing forces.

References Cited in the file of this patent

UNITED STATES PATENTS

| 1,628,136 | Ford | May 10, 1927 |
| 2,137,974 | Fischel | Nov. 22, 1938 |
| 2,303,641 | Horstmann | Dec. 1, 1942 |
| 2,345,169 | Wunsch et al. | Mar. 28, 1944 |
| 2,484,823 | Hammond | Oct. 18, 1949 |
| 2,709,921 | Sylvan | June 7, 1955 |

FOREIGN PATENTS

| 744,161 | Germany | Jan. 10, 1944 |